(12) United States Patent
Zhao

(10) Patent No.: US 10,338,724 B2
(45) Date of Patent: Jul. 2, 2019

(54) ARRAY SUBSTRATE AND METHOD FOR FABRICATING THE SAME, AND DISPLAY DEVICE AND METHOD FOR DRIVING THE SAME

(71) Applicants: Shanghai Tianma Micro-Electronics Co., Ltd., Shanghai (CN); Tianma Micro-Electronics Co., Ltd., Shenzhen (CN)

(72) Inventor: Jian Zhao, Shanghai (CN)

(73) Assignees: Shanghai Tianma Micro-Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 495 days.

(21) Appl. No.: 14/688,693

(22) Filed: Apr. 16, 2015

(65) Prior Publication Data
US 2016/0117039 A1    Apr. 28, 2016

(30) Foreign Application Priority Data

Oct. 28, 2014    (CN) .......................... 2014 1 0588216

(51) Int. Cl.
*G06F 3/041*    (2006.01)
*G06F 3/044*    (2006.01)
*G02F 1/1333*    (2006.01)

(52) U.S. Cl.
CPC ........ *G06F 3/0416* (2013.01); *G02F 1/13338* (2013.01); *G06F 3/044* (2013.01); *G06F 3/0412* (2013.01); *G06F 2203/04103* (2013.01)

(58) Field of Classification Search
CPC ...... G06F 3/0412; G06F 3/0413; G06F 3/044; G06F 2203/04103; G02F 2001/134372
See application file for complete search history.

(56) References Cited

U.S. PATENT DOCUMENTS

| | | | | |
|---|---|---|---|---|
| 5,581,274 | A | * | 12/1996 | Tagawa ................. G06F 3/0412 178/20.01 |
| 8,432,371 | B2 | | 4/2013 | Hotelling et al. |
| 8,575,536 | B2 | * | 11/2013 | Chang ................... G06F 3/0412 250/214 R |
| 9,760,218 | B2 | * | 9/2017 | Lu ........................... G06F 3/044 |

(Continued)

FOREIGN PATENT DOCUMENTS

CN    102541334 A    7/2012
CN    102841716 A    12/2012
(Continued)

*Primary Examiner* — Amare Mengistu
*Assistant Examiner* — Crystal Mathews
(74) *Attorney, Agent, or Firm* — Anova Law Group, PLLC

(57) ABSTRACT

An array substrate and a method for fabricating the array substrate, a display device and a method for driving the display device are provided. The array substrate includes: a substrate having a first surface and a second surface; a touch control signal driving line disposed on the first surface; an isolation layer disposed on the first surface and covering the touch control signal driving line; a via hole formed in the isolation layer; and a gate line disposed on the isolation layer and electrically connected to the touch control signal driving line through the via hole. The scanning time of the array substrate is not reduced due to a touch control detection, and the undercharge of pixels is thus avoided.

14 Claims, 12 Drawing Sheets

(56) References Cited

U.S. PATENT DOCUMENTS

| | | | |
|---|---|---|---|
| 2002/0152048 A1* | 10/2002 | Hayes | G06F 13/4068 702/122 |
| 2006/0097991 A1* | 5/2006 | Hotelling | G06F 3/0416 345/173 |
| 2009/0122021 A1* | 5/2009 | Liu | G02F 1/13338 345/173 |
| 2009/0135158 A1* | 5/2009 | Takahashi | G06F 3/0416 345/174 |
| 2010/0238122 A1* | 9/2010 | Chang | G06F 3/0412 345/173 |
| 2010/0302206 A1* | 12/2010 | Yu | G06F 3/041 345/174 |
| 2010/0315374 A1* | 12/2010 | Chen | G06F 3/044 345/174 |
| 2010/0328268 A1* | 12/2010 | Teranishi | G06F 3/0412 345/175 |
| 2011/0050642 A1* | 3/2011 | Lee | G02F 1/167 345/175 |
| 2011/0080373 A1* | 4/2011 | Wang | G06F 3/044 345/174 |
| 2012/0044171 A1* | 2/2012 | Lee | G06F 3/0412 345/173 |
| 2012/0313888 A1* | 12/2012 | Lee, II | G06F 3/044 345/174 |
| 2013/0162517 A1* | 6/2013 | Gay | G06F 3/046 345/156 |
| 2013/0162560 A1* | 6/2013 | Sun | G06F 3/041 345/173 |
| 2013/0162570 A1* | 6/2013 | Shin | G06F 3/041 345/173 |
| 2014/0055685 A1* | 2/2014 | Wang | G06F 3/0412 349/12 |
| 2014/0062944 A1 | 3/2014 | Wang et al. | |
| 2014/0078418 A1* | 3/2014 | Mu | G06F 3/0412 349/12 |
| 2014/0125880 A1* | 5/2014 | Tsai | G02F 1/13338 349/12 |
| 2014/0176494 A1* | 6/2014 | Huang | G02F 1/13338 345/174 |
| 2014/0184940 A1* | 7/2014 | Ma | G02F 1/13338 349/12 |
| 2014/0204055 A1* | 7/2014 | Lu | G06F 3/0412 345/174 |
| 2015/0077370 A1* | 3/2015 | Kim | G06F 3/0416 345/173 |
| 2015/0145808 A1* | 5/2015 | Cho | G06F 3/0412 345/174 |
| 2015/0234510 A1* | 8/2015 | Chang | G06F 3/0412 345/173 |
| 2015/0286317 A1* | 10/2015 | Shepelev | G06F 3/0416 345/174 |
| 2015/0362773 A1* | 12/2015 | Mu | G02F 1/13338 349/12 |
| 2016/0027356 A1* | 1/2016 | Cheng | H01L 27/12 345/173 |
| 2016/0070398 A1* | 3/2016 | Worfolk | G06F 3/044 345/174 |
| 2016/0188071 A1* | 6/2016 | Xu | G06F 3/044 345/174 |
| 2016/0266677 A1* | 9/2016 | Liu | G06F 3/044 |
| 2016/0313865 A1* | 10/2016 | Chang | G06F 3/0412 |
| 2016/0349887 A1* | 12/2016 | Wang | G06F 3/046 |
| 2016/0349919 A1* | 12/2016 | Chang | G06F 3/0416 |
| 2017/0003790 A1* | 1/2017 | Gao | G06F 3/0412 |
| 2017/0123579 A1* | 5/2017 | Yan | G06F 3/0412 |
| 2017/0153731 A1* | 6/2017 | Liu | G06F 3/0412 |

FOREIGN PATENT DOCUMENTS

| | | |
|---|---|---|
| CN | 103279215 | 9/2013 |
| CN | 103995635 A | 8/2014 |

* cited by examiner

ARRAY SUBSTRATE AND METHOD FOR FABRICATING THE SAME, AND DISPLAY DEVICE AND METHOD FOR DRIVING THE SAME

CROSS-REFERENCES TO RELATED APPLICATIONS

This application claims the benefit of priority to Chinese Patent Application No. 201410588216.4, filed with the Chinese Patent Office on Oct. 28, 2014 and entitled "ARRAY SUBSTRATE AND METHOD FOR FABRICATING THE SAME, AND DISPLAY DEVICE AND METHOD FOR DRIVING THE SAME," the content of which is incorporated herein by reference in its entirety.

TECHNICAL FIELD

The disclosure relates to photoelectric technology, and more particular to an array substrate and a method for fabricating an array substrate, a display device and a method for driving a display device.

BACKGROUND OF THE INVENTION

Display technology plays an important role in the development of the current technology. Currently, display technologies mainly include liquid crystal display (LCD) technology, light emitting diode (LED) technology and organic light-emitting diode (OLED) technology.

Display technology and touch control technology can be combined to form a display device with a touch control function. Taking a liquid crystal display device as an example, the liquid crystal display device generally includes an array substrate, a color filter substrate and a liquid crystal disposed between the array substrate and the color filter substrate. The in-cell touch-control display device in which a touch control structure is disposed between the array substrate and the color film substrate has advantages of reduced thickness and higher picture quality.

However, in a conventional in-cell touch-control display device, a poor performance of a dark line or a bright line may be caused by an undercharge of pixels. Particularly, such poor performance due to the undercharge becomes more apparent in large-size display devices.

BRIEF SUMMARY OF THE INVENTION

In view of the above, an array substrate is provided in one aspect of the disclosure. The array substrate includes: a substrate having a first surface and a second surface opposite to the first surface; a touch control signal driving line disposed at the first surface; an isolation layer disposed on the first surface and covering the touch control signal driving line, where a via hole is formed in the isolation layer; and a gate line disposed at the isolation layer, where the gate line is electrically connected to the touch control signal driving line through the via hole.

In another aspect of the disclosure, a display device is provided, which includes a rear substrate and the array substrate as described above.

In another aspect of the disclosure, a method for driving a display device is provided, which is applied to the display device as described above. The method includes: transmitting a touch control driving signal as a scanning signal through a gate line, when the touch control driving signal is transmitted through the touch control signal driving line.

In another aspect of the disclosure, a method for fabricating an array substrate is provided, which includes: providing a substrate having a first surface and a second surface opposite the first surface; forming a touch control signal driving line on the first surface; forming an isolation layer on the touch control signal driving line; forming a via hole in the isolation layer to expose the touch-control signal driving line through the via hole; and forming a gate line on the isolation layer, wherein the gate line is electrically connected to the touch control signal driving line through the via hole.

DETAILED DESCRIPTION OF THE INVENTION

In order to prevent interference between the display signal and the touch control signal, a time-sharing scanning mode is adopted generally for the conventional in-cell touch-control display device. That is, for each frame of picture, the time for display scan is reduced, and the saved time is used for touch control scan. However, the reduction of the time for display scan for each frame of picture causes the undercharge of pixels, thereby resulting in a poor performance of a dark line or bright line in the displayed picture. Particularly, such poor performance due to the undercharge becomes more apparent for large-size display devices.

For this purpose, an array substrate is provided according to the disclosure. The array substrate includes a touch control signal driving line connected to a gate line, where a touch control detection is performed on the array substrate, and a display scan is performed on the array substrate synchronously. Thereby it is not necessary to reduce the time of the display scan for each frame of picture, and thus the undercharge of pixels is avoided. Therefore, the performance of the display device can be improved, particularly for the large-sized display device.

To make the above object, features and advantages of the disclosure more apparent and easy to be understood, in the following, particular embodiments of the disclosure will be illustrated in detail in conjunction with the accompanying drawings.

It should be noted that a structure or layer may be directly "above" another layer or structure, or there is another structure provided there between, in the case that the structure or layer is referred as being 'above' another layer in the specification. Moreover, the drawings illustrate some embodiments of the disclosure, which are schematic diagrams of the ideal embodiments of the disclosure.

An array substrate is provided according to an embodiment of the disclosure.

Figure 1:
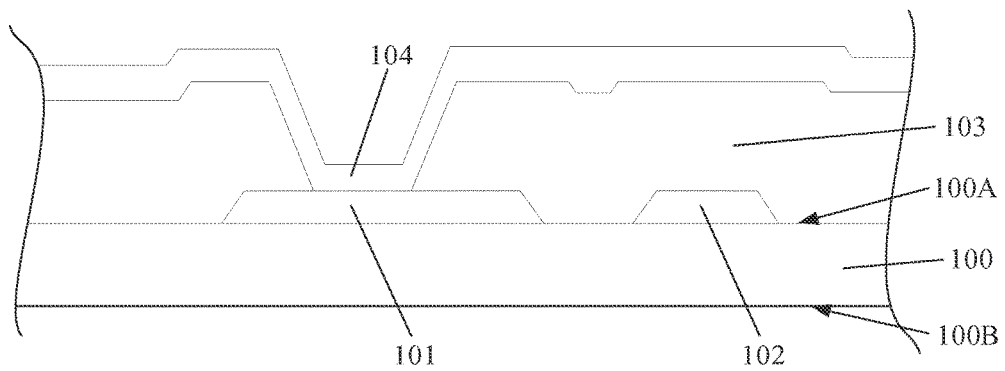
FIG. 1 is a simplified cross-sectional view of an array substrate according to an embodiment of the disclosure.

Referring to FIG. 1, the array substrate according to the embodiment includes a substrate 100, a touch control signal driving line 101, a touch control signal sensing line 102, an isolation layer 103 and a gate line 104. The substrate 100 has a first surface 100A and a second surface 100B opposite to the first surface 100A. The touch control signal driving line 101 is directly disposed on the first surface 100A. The touch control signal sensing line 102 is also directly disposed on the first surface 100A. Therefore, the touch control signal sensing line 102 is disposed on the same layer as the touch control signal driving line 101. An isolation layer 103 is also disposed on the first surface 100A and has an electrically isolating function. The isolation layer 103 covers the touch control signal driving line 101 and the touch control signal sensing line 102, to isolate the touch-control signal driving line 101 and the touch-control signal sensing line 102 from other structures. A gate line 104 is disposed on the isolation layer 103. A via hole is formed in the isolation layer 103. The gate line 104 is electrically connected to the touch control signal driving line 101 through the via hole.

Although not shown in FIG. 1, the array substrate may further include a thin film transistor (TFT), a data line, and a pixel electrode. The gate of the thin film transistor is electrically connected to the gate line 104, (or a part of the gate line 104 is used as the gate of the thin film transistor). That is, the gate of the thin film transistor is electrically connected to the touch control signal driving line 101 via the gate line 104. The source of the thin film transistor may be electrically connected to the data line, and the drain of the thin film transistor may be electrically connected to the pixel electrode. The array substrate may further include a planarizing layer adapted to cover some structures such as the pixel electrode, and an orientation layer located above the planarizing layer.

Figure 2:
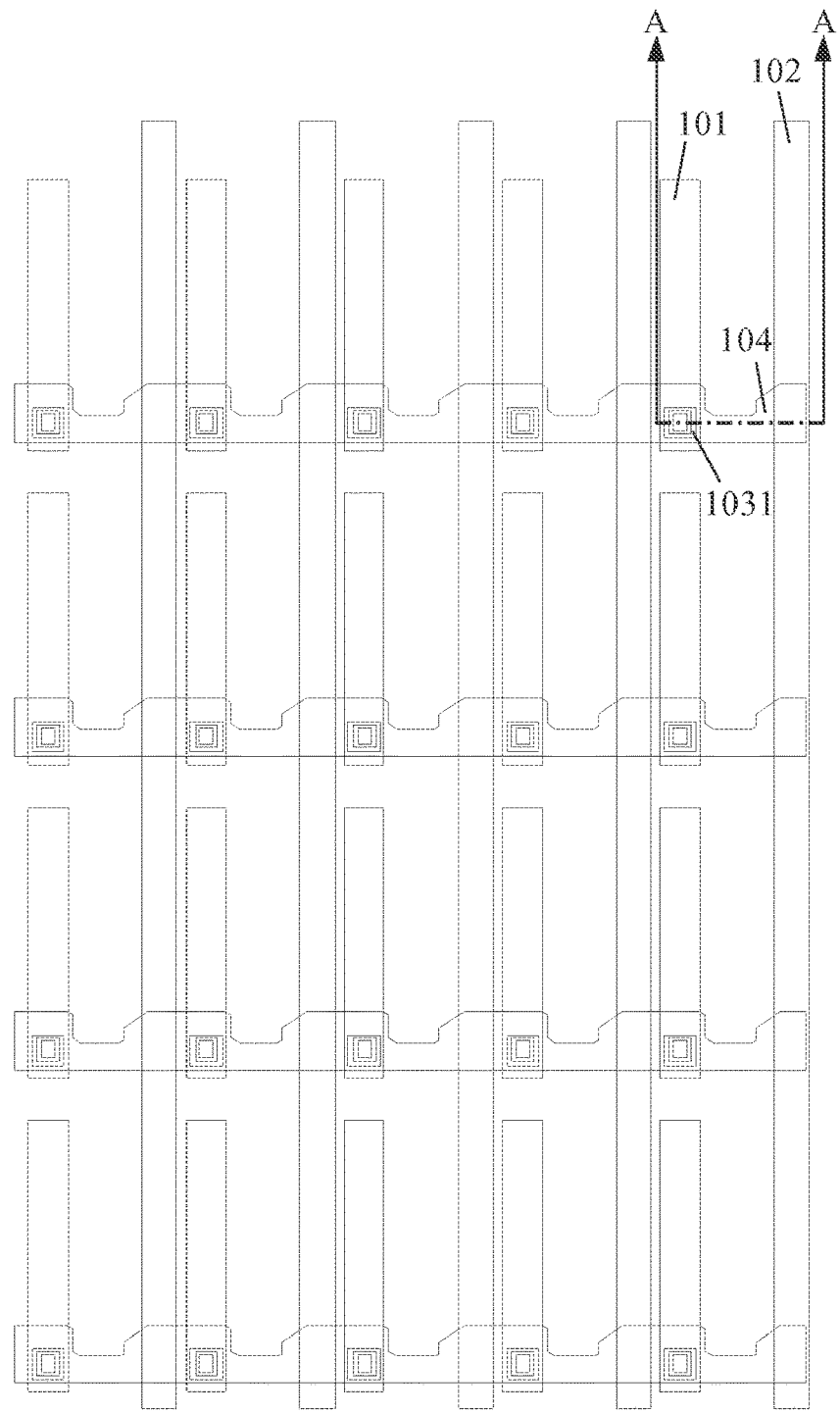
FIG. 2 is a top schematic view of the array substrate shown in FIG. 1.

Referring to FIG. 2, a top schematic view of the array substrate shown in FIG. 1 is shown. The sectional structure shown in FIG. 1 is a sectional view obtained by cutting along a dash dot line AA in FIG. 2.

It should be noted that FIG. 2 is a top schematic view, in which portions of the touch control signal driving line 101 and the touch control signal sensing line 102 which are covered by the gate line 104 are shown. In addition, the isolation layer 103 is not shown in FIG. 2, and the via hole in the isolation layer 103 is represented by a box 1031.

As shown in FIG. 2, multiple gate lines 104 are arranged parallel to each other, and multiple touch control signal driving lines 101 are arranged parallel to each other. One of gate lines 104 perpendicularly intersects with one of the touch control signal driving lines 101, and thereby defining a sub-pixel region. One of the touch control signal driving lines 101 is located in one sub-pixel region accordingly. In this case, the resolution of the display pixel is equal to that of the touch coordinate in the array substrate according to the embodiment.

As shown in FIG. 2, multiple touch control signal driving lines 101 in the same row are crossed below one gate line 104, and each of gate lines 104 is electrically connected to the touch control signal driving lines 101 therebelow through the via holes in the isolation layer 103 as shown in FIG. 1, that is, a bridge connection structure is formed by the touch-control signal driving lines 101 and the gate line 104. That is, the touch control signal driving lines 101 in the same row are electrically connected together by the gate line 104 used as a bridge part, so as to form a series structure extended along a first axis direction. Multiple series structures extended along the first axis direction are arranged parallel to each other, and each of series structures is formed by one gate line 104 and the touch control signal driving lines 101 below the gate line 104.

As shown in FIG. 2, multiple touch control signal sensing lines 102 are arranged in parallel, each of the touch control signal sensing lines 102 extends along a second axis direction. Each of the touch-control signal sensing lines 102 perpendicularly intersects with all of the series structures.

Thus, the touch-control signal driving lines 101 are insulated from the touch-control signal sensing lines 102. The series structure is partially overlapped with the touch control signal sensing line 102 (that is, the touch control signal driving line 101 is partially overlapped with the touch-control signal sensing line 102), and the overlapped portion is isolated by the isolation layer 103. The isolation layer 103 is insulating. Therefore, a coupling capacitance may be generated between the series structure and the touch-control signal sensing line 102, which is sufficient to perform the touch control detection. That is, the coupling capacitance, sufficient to perform the touch control detection, can be generated between the touch control signal driving line 101 and the touch-control signal sensing line 102.

Therefore, a touch operation may be detected in a principle of mutual capacitance detection in the embodiment. In other embodiments of the disclosure, the touch control operation may be detected in a self-capacitance detection mode by the touch control signal driving line and the touch control signal sensing line.

In this embodiment, the coupling capacitance can be generated between the touch control signal driving line 101 and the touch control signal sensing line 102. A touch of a respective location may affect the coupling capacitance between the touch control signal driving line 101 and the touch control signal sensing line 102 in the vicinity of the touch location. Therefore, a capacitance between two kinds of touch control lines (the term "two kinds of touch control lines" refers to the touch control signal driving line 101 and the touch control signal sensing line 102) at the touch location is changed. The capacitance is detected by the touch control signal sensing line 102 to obtain a variation of the capacitance at the respective touch location. Then, the coordinates of the touch location may be calculated depending on the variation of the capacitance.

In this embodiment, the touch control signal driving line 101 is electrically connected to the gate line 104 through the via hole in the isolation layer 103. In this case, the touch control signal driving line 101 functions in two aspects. In one aspect, the touch control signal driving line 101 can transmit the touch control driving signal. In the other aspect, the touch control signal driving line 101 is electrically connected to the gate line 104, to transmit a scanning signal in a display process as a scanning line.

It is more important that, in the array substrate according to the embodiment, the touch control signal driving line 101 transmits the touch control driving signal and the scanning signal synchronously (simultaneously), that is, the same signal is used as both the touch control driving signal and the scanning signal. In this case, the scan time of the array substrate may not be reduced due to touch control detection, and therefore the undercharge of pixels is avoided.

Additionally, for the array substrate according to the embodiment, the array substrate is inverted when assembled to form a display device. Thus, the touch control signal driving line 101 and the touch control signal sensing line 102 are closer to user's eyes than other lay structures (such as a pixel electrode subsequently formed on the gate line). Therefore, the touch control signal driving line 101 and the touch control signal sensing line 102 are closer to a touching finger than other lay structures, and therefore a signal to noise ratio of the touch control detection is improved.

Based on the functions of the touch control signal driving line 101 as described above, the touch control signal driving line 101 functions as a scanning line. Thus, it is considered that the touch control signal driving line 101 is used as the scanning line. However, there are two differences between the touch control signal driving line 101 and the scanning line. Firstly, not all of scanning lines must be used as the touch control signal driving lines 101, and the interlaced scanning lines may be used as the touch control signal driving lines 101. Secondly, not the entire scanning line must be used as the touch control signal driving lines 101, and a part of the scanning line may be used as the touch control signal driving lines 101.

It should be noted that the touch control signal sensing line 102 may be located on the second surface 100B in other embodiments of the disclosure. Since generally the substrate 100 per se is insulating, the touch control signal sensing line 102 may be designed flexibly. For example, the touch control signal sensing line 102 may extend along the first axis direction or the second axis direction, in the case that the touch control signal driving lines 101 may extend along the first axis, where the first axis direction is intersected with the second axis direction.

An array substrate is provided according to another embodiment of the disclosure.

Figure 3:
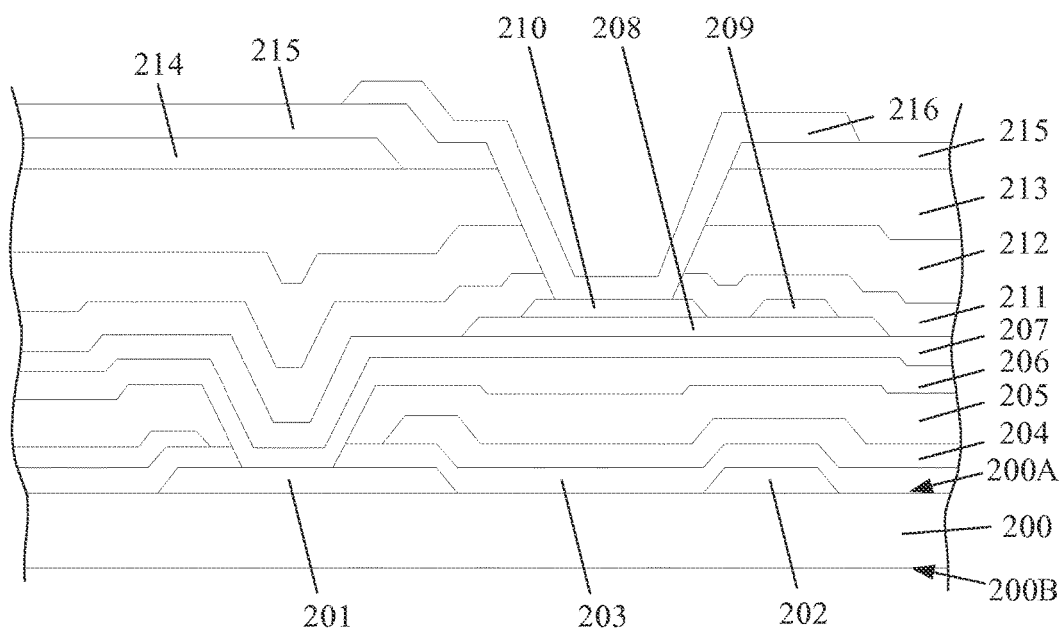
FIG. 3 is a structural schematic diagram of an array substrate according to another embodiment of the disclosure.

Referring to FIG. 3, the array substrate according to the embodiment includes a substrate 200, a touch control signal driving line 201, a touch control signal sensing line 202, an isolation layer and a gate line 206. The substrate 200 has a first surface 200A and a second surface 200B opposite to the first surface 200A. The touch control signal driving line 201 is disposed on the first surface 200A. The touch control signal sensing line 202 is also disposed on the first surface 200A. The touch control signal sensing line 202 is disposed in the same layer as the touch control signal driving line 201.

Referring to FIG. 3 again, the isolation layer includes a first insulation layer 203, a shielding layer 204 and a second insulation layer 205. The shielding layer 204 is electrically conductive and functions as an electrostatic shielding. Although the shielding layer 204 is electrically conductive, the shielding layer 204 is disposed between the first insulation layer 203 and the second insulation layer 205 in the isolation layer. Therefore, the isolation layer as a whole still has an electrically isolating function. The first insulation layer 203 covers the touch control signal driving line 201 and the touch-control signal sensing line 202. The shielding layer 204 covers the first insulation layer 203. That is, the first insulation layer 203 is disposed between the shielding layer 204 and the touch control signal driving line 201, to insulate the shielding layer 204 from the touch control signal driving line 201. Moreover, the shielding layer 204 is disposed above the touch control signal driving line 201 and the touch control signal sensing line 202, to shield the touch control signal driving line 201 and the touch control signal sensing line 202 from the interference of other signals. The second insulation layer 205 covers the shielding layer 204, to insulate the shielding layer 204 from other conductive structures.

Still referring to FIG. 3, the gate line 206 is disposed above the second insulation layer 205. Via holes (not shown) are formed in the first insulation layer 203, the shielding layer 204 and the second insulation layer 205. The locations of the via holes in the respective layers are at least partially overlapped and ensure that the gate line 206 is electrically connected to the touch control signal driving line 201 through the respective via holes. In the case that the gate line 206 is electrically connected to the touch control signal driving lines 201 through the respective via holes, the gate line 206 as a bridge structure is electrically connected to the touch control signal driving lines 201 which are located at the same straight line. In this way, the touch-control signal driving lines 201 are insulated from the touch control signal sensing line 202 and intersect with the touch control signal sensing line 202.

Referring to FIG. 3 again, the array substrate further includes a thin film transistor electrically connected to the gate line 206. Specifically, the gate of the thin film transistor is electrically connected to the gate line 206, (or a part of the gate line 206 is used as the gate of the thin film transistor). The source 209 of the thin film transistor may be electrically connected to the data line (not shown). The drain 210 of the thin film transistor may be electrically connected to a pixel electrode 216. The thin film transistor further includes a semiconductor layer 208 and a gate dielectric layer 207. The gate dielectric layer 207 covers the gate line 206 and is disposed between the gate line 206 and the semiconductor layer 208.

Referring to FIG. 3 again, the array substrate further includes a third insulation layer 211, a black matrix 212, a planarizing layer 213 and a common electrode layer 214. The third insulation layer 211 covers the thin film transistor. The black matrix 212 covers the third insulation layer 211. The planarizing layer 213 is disposed above the black matrix 212. The common electrode layer 214 is disposed on the planarizing layer 213. A fourth insulation layer 215 is disposed on the common electrode layer 214. The pixel electrode 216 is disposed on the fourth insulation layer 215. Via holes at least partially overlapped are formed in the third insulation layer 211, the black matrix 212, the planarizing layer 213 and the fourth insulation layer 215. The pixel electrode 216 is electrically connected to the drain 210 of the thin film transistor through the via holes.

Although not shown in FIG. 3, an orientation layer may be disposed above the fourth insulation layer 215 and the pixel electrode 216 shown in FIG. 3.

It should be noted that, although the pixel electrode 216 has a portion overlapped with the black matrix 212 as shown in FIG. 3, generally the black matrix 212 is mainly provided at the periphery of the pixel electrode 216, that is, most portion of the pixel electrode 216 is not overlapped with the black matrix 212. In other embodiments of the disclosure, the touch control signal sensing line 202 may be located on the second surface 200B.

In this embodiment, similarly to the above described embodiment, the touch control signal driving line 201 is electrically connected to the gate line 206 through the via hole in the isolation layer. In this case, the touch control signal driving line not only can transmit the touch control driving signal, but also can be used as a scanning line to transmit a scanning signal. Moreover, the touch control signal driving line 201 transmits the touch control driving signal and the scanning signal synchronously. In this case, the scan time is not reduced due to touch control detection, i.e., the time for the display scan is increased, and therefore the undercharge of pixels can be avoided. Particularly, in the case that the display panel with the array substrate has a high resolution, the poor performance of the dark line or bright line due to the undercharge of pixels may be effectively avoided by the array substrate according to the embodiment.

In this embodiment, the second insulation layer 205 is a color filter layer, and the black matrix 212 covers the color filter layer. Since the color filter layer and the black matrix 212 both are disposed on the array substrate, instead of a color filter substrate 200, only a common plate is required to form such as a liquid crystal display device, when the array substrate according to the embodiment is assembled into a display device. Therefore, the process for fabricating the color filter substrate 200 may be omitted. The shielding layer 204 and the gate line 206 are spaced apart by the color filter layer used as the second insulation layer 205. The greater the thickness of the color filter layer, the better the insulation performance. Therefore, a parasitic capacitance between the shielding layer 204 and the gate line 206 can be reduced, and the delay of the gate signal may be reduced, thereby a normal display driving is ensured.

In this embodiment, the electrical signals from the layer structures above the shielding layer 204 may be prevented from interfering the touch control detection, by providing the shielding layer 204 above the touch control signal driving line 201 and the touch control signal sensing line 202. Therefore, the display driving and the touch-control detection may be preformed synchronously, and a signal to noise ratio of the touch control detection is improved.

Figure 4:
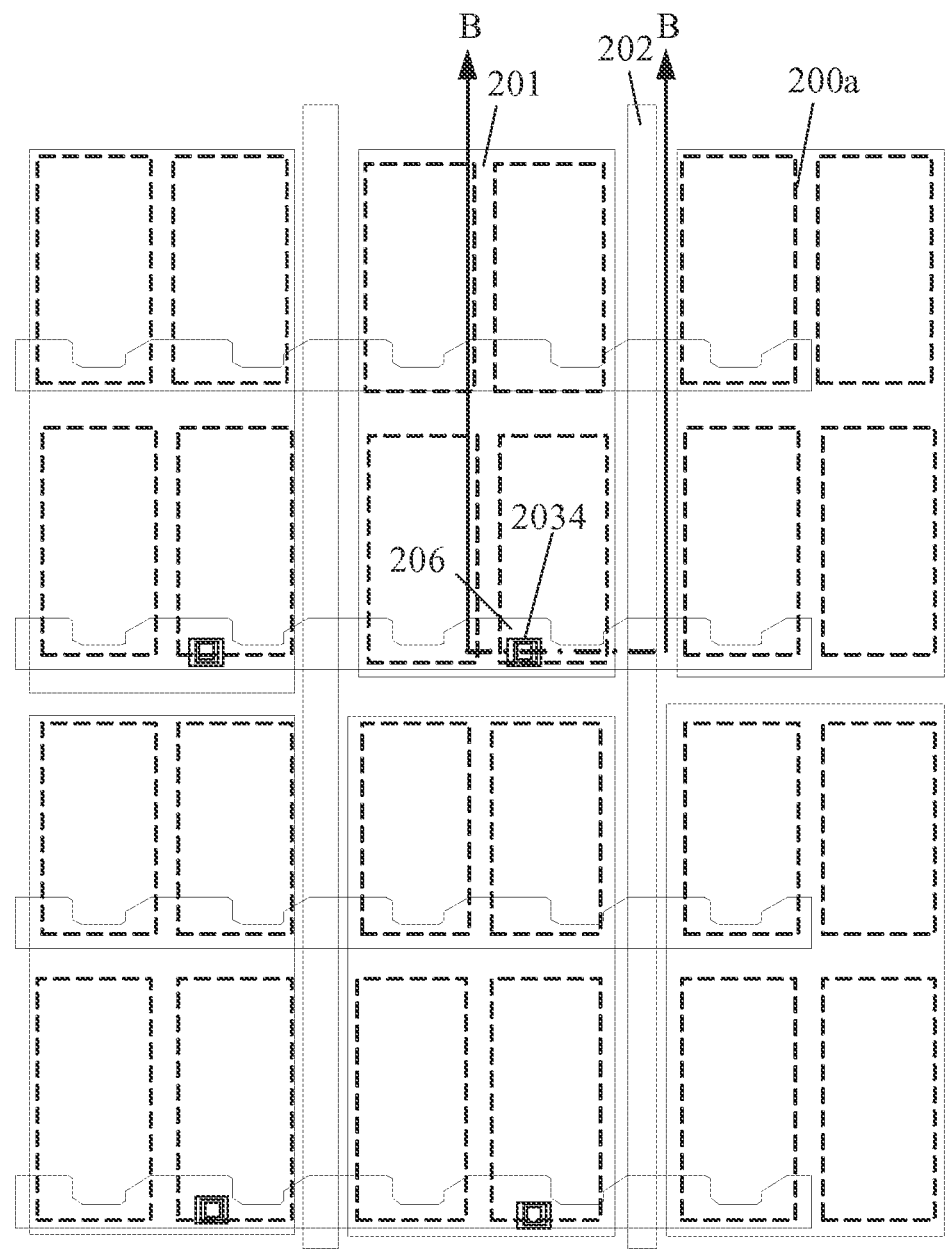
FIG. 4 is a top structural schematic diagram of the array substrate shown in FIG. 3.

Referring to FIG. 4, a top schematic diagram of the array substrate shown in FIG. 3 is shown. The cross-sectional structure shown in FIG. 3 is a sectional view obtained by cutting along the dash dot line BB in FIG. 4.

It should be noted that FIG. 4 is a top schematic view, in which portions of the touch control signal driving line 201 and the touch control signal sensing line 202 which are covered by the gate line 206 are shown in FIG. 4. In addition, the isolation layer (including the first insulation layer 203, the shielding layer 204 and the second insulation layer 205) is not shown in FIG. 4, and the via holes in the isolation layer is represented by a box 2034.

As shown in FIG. 4, multiple gate lines 206 are arranged parallel to each other, and multiple touch control signal driving lines 201 are arranged parallel to each other. One of the gate lines 206 perpendicularly intersects with one of the touch-control signal driving lines 201, and thereby defining a sub-pixel region.

This embodiment differs from the above described embodiments in that, each of the touch-control signal driving lines 201 is located in four corresponding sub-pixel regions. Specifically, a sub-pixel region is represents by a dashed box 200a in FIG. 4. Thus, each of the touch control signal driving lines 201 corresponds to four sub-pixel regions arranged in two rows and two columns. In this case, the resolution of the touch control coordinate is lower than that of the display pixel in the array substrate according to the embodiment. Specifically, the resolution of the touch-control coordinate is a quarter of that of the display pixel. Since generally the display pixel has a high resolution, the resolution of the touch control coordinates still can meet the demand of the touch control detection well, even if the resolution of the touch-control coordinates is a quarter of that of the display pixel. On the other hand, the appropriate reduction of the resolution of the touch-control coordinates can decrease a calculation amount of the touch control detection, and thereby the efficiency is improved.

It should be noted that one touch control signal driving line may also correspond to an integer number of sub-pixel regions, such as two, three or five and more, in other embodiments of the disclosure.

As shown in FIG. 4, multiple touch control signal driving lines 201 in the same row are disposed below one gate line 206, and each of gate lines 206 is electrically connected to the touch-control signal driving lines 201 therebelow through the via holes in the isolation layer as shown in FIG. 4. That is, a bridge connection structure is formed by the touch control signal driving lines 201 and the gate line 206. That is, the touch control signal driving lines 201 in the same row are electrically connected together by one gate line 206 used as a bridge part, so as to form a series structure (not noted) extended along a first axis direction. Multiple series structures extended along the first axis direction are arranged parallel to each other, and each of the series structures is formed by one gate lines 206 and the touch-control signal driving lines 201 below the gate lines 206.

As shown in FIG. 4, multiple touch control signal sensing lines 202 are arranged in parallel, and each of the touch control signal sensing lines 202 extends along a second axis direction. Each of the touch-control signal sensing lines 202 perpendicularly intersects with all of the series structures.

Thus, the touch-control signal driving lines 201 are insulated from the touch-control signal sensing lines 202. The series structure is partially overlapped with the touch-control signal sensing line 202 (that is, the touch control signal driving line 201 is partially overlapped with the touch control signal sensing line 202), and the overlapped portion is isolated by the isolation layer 203. The isolation layer 203 is insulating. Therefore, a coupling capacitance may be generated between the series structure and the touch-control signal sensing line 202, which is sufficient to perform the touch control detection. That is, the coupling capacitance, sufficient to perform the touch control detection, can be generated between the touch control signal driving line 201 and the touch control signal sensing line 202.

An array substrate is provided according to further another embodiment of the disclosure.

Figure 5:
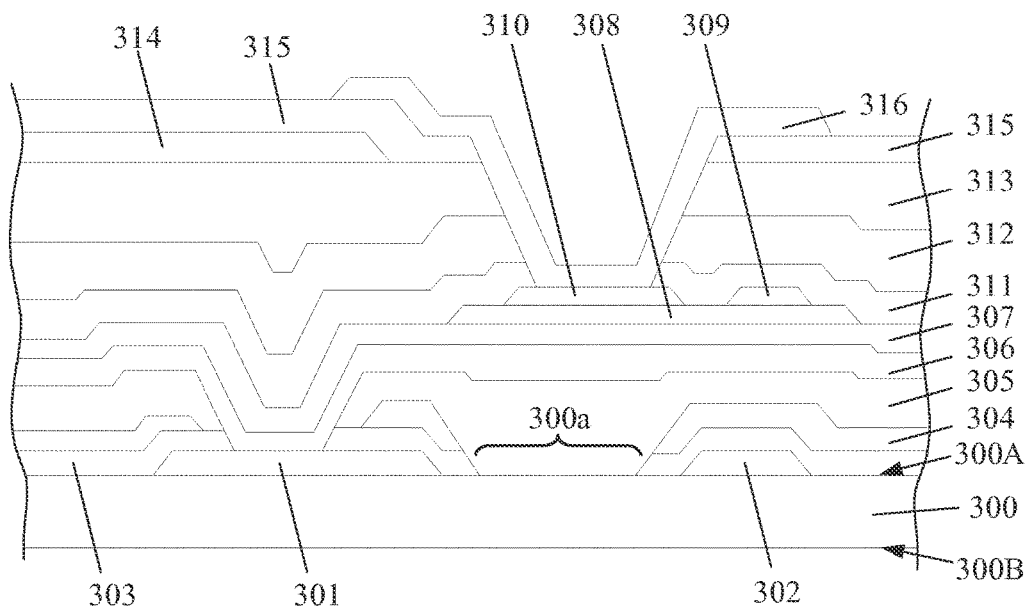
FIG. 5 is a cross-sectional view of an array substrate according to further another embodiment of the disclosure.

Referring to FIG. 5, the array substrate according to the embodiment includes a substrate 300, a touch control signal driving line 301, a touch control signal sensing line 302, an isolation layer (not noted) and a gate line 306. The substrate 300 has a first surface 300A and a second surface 300B opposite to the first surface 300A. The touch control signal driving line 301 is disposed on the first surface 300A. The touch control signal sensing line 302 is also disposed on the first surface 300A. The touch control signal sensing line 302 is formed in the same layer with the touch control signal driving line 301.

Referring to FIG. 5 again, the isolation layer includes a first insulation layer 303, a shielding layer 304 and a second insulation layer 305. The shielding layer 304 is electrically conductive and functions as an electrostatic shielding. Although the shielding layer 304 is electrically conductive, the shielding layer 304 is formed between the first insulation layer 303 and the second insulation layer 305 in the isolation layer. Therefore, the isolation layer as a whole still has an electrically isolating function. The first insulation layer 303 covers the touch control signal driving line 301 and the touch control signal sensing line 302. The shielding layer 304 covers the first insulation layer 303. That is, the first insulation layer 303 is disposed between the shielding layer 304 and the touch control signal driving line 301, to insulate the shielding layer 304 from the touch control signal driving line 301. Moreover, the shielding layer 304 is disposed above the touch control signal driving line 301 and the touch control signal sensing line 302, to shield the touch control signal driving line 301 and the touch control signal sensing line 302 from the interference of other signals. The second insulation layer 305 covers the shielding layer 304 to insulate the shielding layer 304 from other conductive structures.

Referring to FIG. 5 again, the gate line 306 is disposed above the second insulation layer 305. Via holes (not shown) are formed in the first insulation layer 303, the shielding layer 304 and the second insulation layer 305. The locations of the via holes in the respective layers are at least partially overlapped. Thus, it is ensured that the gate line 306 is electrically connected to the touch control signal driving line 301 through the respective via holes.

Referring to FIG. 5 again, the array substrate further includes a thin film transistor electrically connected to the gate line 306. Specifically, the gate of the thin film transistor is electrically connected to the gate line 306, (or a part of the gate line 306 is used as the gate of the thin film transistor). The source 309 of the thin film transistor may be electrically connected to the data line (not shown). The drain 310 of the thin film transistor may be electrically connected to a pixel electrode 316. The thin film transistor further includes a semiconductor layer 308 and a gate dielectric layer 307. The gate dielectric layer 307 covers the gate line 306, and the gate dielectric layer 307 is disposed between the gate line 306 and the semiconductor layer 308.

The array substrate further includes a third insulation layer 311, a black matrix 312, a planarizing layer 313 and a common electrode layer 314. The third insulation layer 311 covers the thin film transistor. The black matrix 312 covers the third insulation layer 311. The planarizing layer 313 is disposed above the black matrix 312. The common electrode layer 314 is disposed on the planarizing layer 313. A fourth insulation layer 315 is disposed on the common electrode layer 314. The pixel electrode 316 is disposed on the fourth insulation layer 315. Via holes (not shown) at least partially overlapped are formed in the third insulation layer 311, the black matrix 312, the planarizing layer 313 and the fourth insulation layer 315. The pixel electrode 316 is electrically connected to the drain of the thin film transistor through the via holes.

Although not shown in FIG. 5, an orientation layer may be provided above the fourth insulation layer 315 and the pixel electrode 316 shown in FIG. 5.

It should be noted that, although the pixel electrode 316 has an overlapped portion with the black matrix 312 as shown in FIG. 5, generally the black matrix 312 is mainly provided at the periphery of the pixel electrode 316, that is, most portion of the pixel electrode 316 is not overlapped with the black matrix 312. In other embodiments of the disclosure, the touch control signal sensing line 302 may be located on the second surface 300B.

In this embodiment, similarly to the above described embodiment, the touch control signal driving line 301 is electrically connected to the gate line 306 through the via hole in the isolation layer. In this case, the touch control signal driving line 301 not only can transmit the touch control driving signal, but also can be used as a scanning line to transmit a scanning signal. Moreover, the touch control signal driving line 301 transmits the touch control driving signal and the scanning signal synchronously. In this case, the scan time can not be reduced due to touch control detection, i.e., the time for the display scan is increased, and therefore the undercharge of pixels can be avoided. Particularly, in the case that the display panel with the array substrate has a high resolution, the poor performance of the dark line or bright line due to the undercharge of pixels may be effectively avoided by the array substrate according to the embodiment.

In this embodiment, the second insulation layer 305 is a color filter layer, and the black matrix 312 covers the color filter layer. Since the color filter layer and the black matrix 312 both are disposed on the array substrate, instead of a color filter substrate, only a common plate is required to form such as a liquid crystal display device, when the array substrate according to the embodiment is assembled into a display device. Therefore, the process for fabricating the color filter substrate may be omitted. The shielding layer 304 and the gate line 306 is spaced apart by the color filter layer used as the second insulation layer 305. The greater the thickness of the color filter layer, the better the insulation performance. Therefore, a parasitic capacitance between the shielding layer 304 and the gate line 306 can be reduced, and the delay of the gate signal may be reduced, thereby a normal displaying driving is ensured.

In this embodiment, the electrical signals from the layer structures above the shielding layer 304 may be prevented from interfering the touch-control detection, by providing the shielding layer 304 above the touch control signal driving line 301 and the touch control signal sensing line 302. Therefore, the display driving and the touch control detection may be preformed synchronously, and thus the signal to noise ratio of the touch control detection is improved.

In this embodiment, a first region 300a is provided between the touch control signal driving line 301 and the touch control signal sensing line 302. A portion, located above the first region 300a, of the shielding layer 304 is hollowed, which may prevent the electric field lines between the touch control signal driving line 301 and the touch control signal sensing line 302 from passing through the shielding layer 304 above the first region 300a. Therefore, it is ensured that more electric field lines between the touch control signal driving line 301 and the touch control signal sensing line 302 pass through the second surface 300B of the substrate 300. After the array substrate according to the embodiment is assembled into a display device, the second surface 300B of the substrate 300 is closer to the touch control operation of the finger than the first surface 300A of the substrate 300. That is, more electric field lines can be used to the touch control operation. Therefore, the sensitivity of the touch control detection for the array substrate may be improved.

A display device is further provided according to another embodiment of the disclosure.

Figure 6:
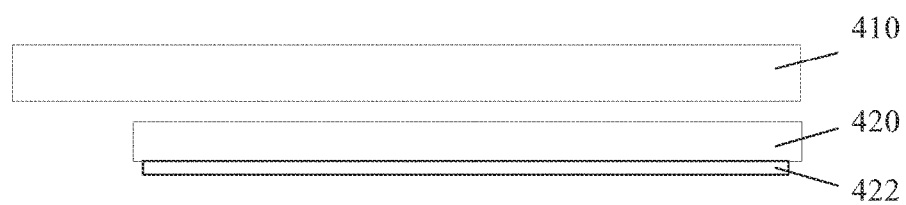
FIG. 6 is a cross-sectional view of a display device according to an embodiment of the disclosure.

Referring to FIG. 6, the display device includes a rear substrate 420 and an array substrate 410, a liquid crystal layer (not shown) may be provided between the rear substrate 420 and the array substrate 410. In this case, the display device is a liquid crystal display (LCD) device. The array substrate 410 may be any one of the array substrates (referring to FIG. 1, FIG. 3 or FIG. 5) according to the above embodiments of the specification. An electrode layer 422 is provided on a surface of the rear substrate 420 which faces away from the array substrate 410. The electrode layer 422 may shield the array substrate 410 from the signal interference generated by conductive structures (such as a circuit of a backlight) below the rear substrate 420, and therefore the performance of the display device is further improved.

It should be noted that the electrode layer 422 is not needed to be provided on the rear substrate 420 in other embodiments of the disclosure. When the array substrate 410 does not include a color filter layer, the display device is a black-and-white liquid crystal display device. When the array substrate 410 includes the color filter layer, the display device is a color liquid crystal display device. In the other embodiment of the disclosure, an organic light emitting layer is disposed between the rear substrate 420 and the array substrate 410. In this case, the display device is an organic light-emitting diode device (OLED).

Since the array substrate 410 is any one of the array substrates 410 according to the above embodiments in the specification, the display device according to the embodiment can display in normal, while can achieve touch control detection. Thus, the charging time for display scan is not affected by the touch control detection. Therefore, the display pixels of the display device may not be undercharged.

A method for driving a display device is provided according to another embodiment of the disclosure.

The method is applied to the display device according to the above embodiment (referring to FIG. 6).

Figures 7, 8:
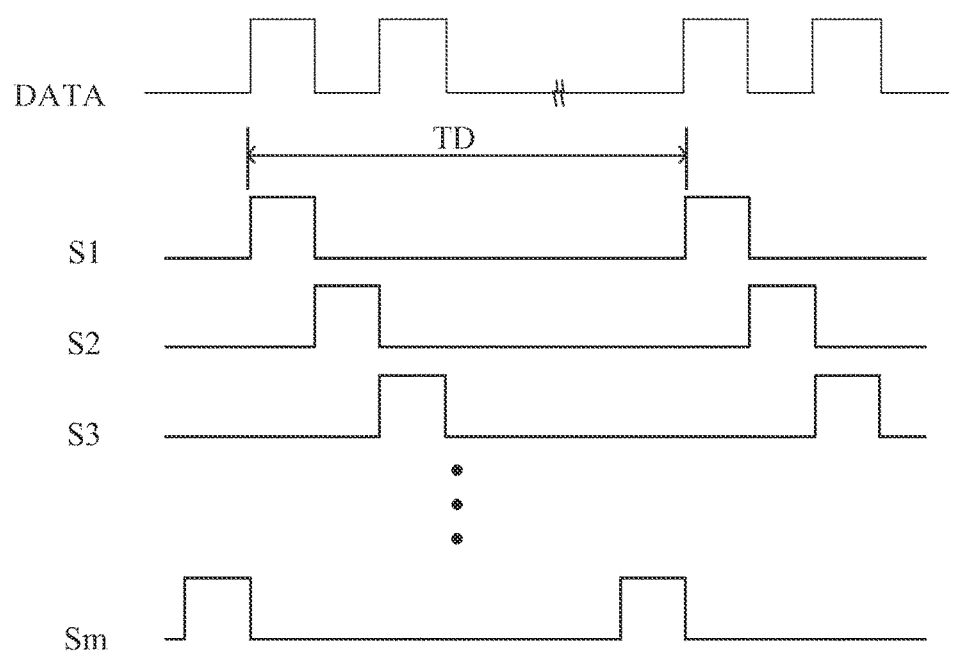
FIG. 7 is an equivalent line diagram of a touch control signal driving line and a touch control signal sensing line in a method for driving a display device according to an embodiment of the disclosure.
FIG. 8 is a timing diagram of signals in the first method for driving a display device according to an embodiment of the disclosure.

Referring to FIG. 7, an equivalent line diagram of a touch control signal driving line and a touch control signal sensing line (in the display device) is shown, in which m touch control signal driving lines (each of the touch control signal driving lines in this embodiment may be considered as a series structure formed by the touch control signal driving lines 101 and the gate line 104 as shown in FIG. 2) extend along a first axis direction and are arranged in parallel, where m is a positive integer. The m touch control signal driving lines includes a touch control signal driving line T1 to a touch control signal driving line Tm, which are distributed sequentially. The touch control signal driving line T1, a touch control signal driving line T2, a touch control signal driving line T3, a touch control signal driving line Tm-2, a touch control signal driving line Tm-1 and the touch control signal driving line Tm are shown in FIG. 7. The gate line is the same line as the touch-control signal driving line, that is, the touch control signal driving line T1 corresponds to a gate line G1, the touch control signal driving line T2 corresponds to a gate line G2, until the touch control signal driving line Tm corresponds to a gate line Gm.

FIG. 7 further shows n touch control signal sensing lines, which extend along the second axis direction and are arranged in parallel, where n is a positive integer. The n touch control signal sensing lines are distributed sequentially as a touch control signal sensing line R1 to a touch control signal sensing line Rn. The touch control signal sensing line R1, a touch control signal sensing line R2, a touch control signal sensing line R3, a touch control signal sensing line R4, a touch control signal sensing line R5, a touch control signal sensing line R6, a touch control signal sensing line Rn-2, a touch control signal sensing line Rn-1 and the touch control signal sensing line Rn are specifically shown in FIG. 7.

In conjunction with FIG. 7 and FIG. 8, FIG. 8 is a timing diagram of signals in the method for driving the display device according to the embodiment.

The method for driving the display device according to the embodiment includes: transmitting synchronously data signals through the respective data lines from a beginning of a certain frame of a picture to an end of the frame of picture. The data signals are shown as a graph DATA in FIG. 8. When the data signals are transmitted through the data lines, the scanning signals are transmitted through the gate lines sequentially, to drive the pixels in the respective rows. Specifically, when the data signal is transmitted at a first time through the respective data lines, a scanning signal S1 is transmitted through the first gate line G1; when the data signal is transmitted at a second time through the respective data lines, a scanning signal S2 is transmitted thought the second gate line G2; when the data signal is transmitted at a third time through the respective data lines, a scanning signal S3 is transmitted thought the third gate line G2; until a scanning signal Sm is transmitted through the m-th (i.e., the last) gate line Gm when the data signal is transmitted at the last time through the respective data lines. Moreover, as previously described, the gate line is the same line as the touch-control signal driving line, and therefore the scanning signal S1 is also used as a touch control driving signal for the first touch control signal driving line T1. After the touch control driving signal is transmitted, all of the touch control signal sensing lines receive sequentially the coupling capacitances generated by the corresponding touch control driving signal, to detect the touch control operation. Similarly, the scanning signal S2 is also used as a touch control driving signal for the second touch control signal driving line T2, the scanning signal S3 is also used as a touch control driving signal for the third touch control signal driving line T3, and so on; until the scanning signal Sm is also used as a touch control driving signal for the m-th touch control signal driving line Tm.

Thus, the respective scanning signal may be used as a touch control driving signal for the touch control detection in a displaying process, for the display device according to the embodiment. When the scanning signal is used to turn on the thin film transistors in the corresponding line on the array substrate, the scanning signal generates a capacitance coupled between the touch control signal driving line and each of the touch control signal sensing lines. The capacitance may be change based on a touch of some objects such as a finger on the display device, which may be used to the touch control detection.

Since the touch control driving signal is used as the scanning signal in this driving method, the charging time for displaying the picture does not affected by the touch control detection during the operation of the display device. That is, the touch control detection has no effect on the displaying operation of the display device. Therefore, the undercharge of pixels may be avoided.

A method for driving a display device is provided according to another embodiment of the disclosure.

The method is applied to the display device according to the above embodiment (referring to FIG. 6).

Figure 9:
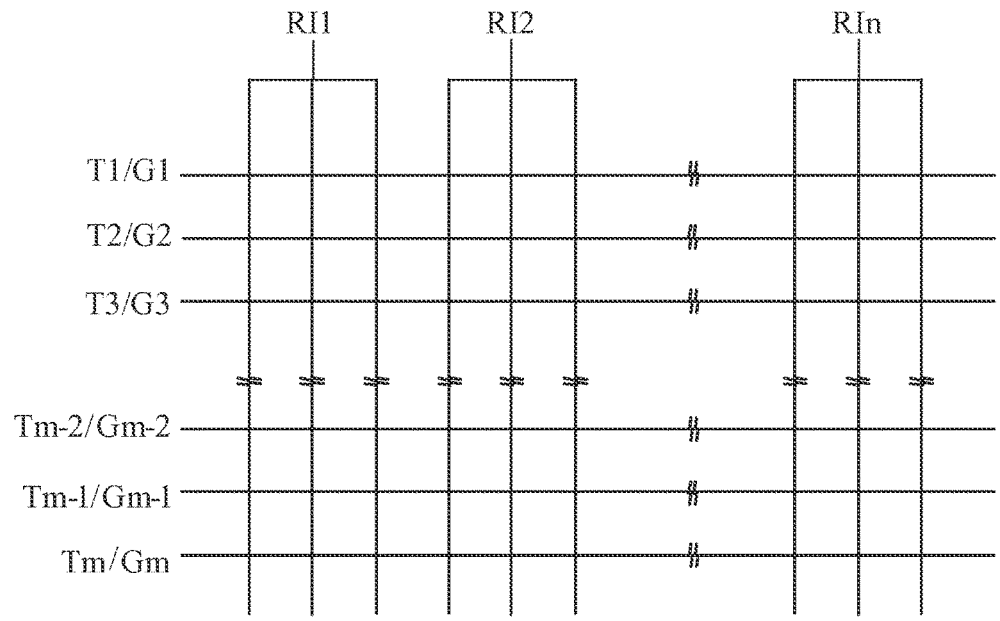
FIG. 9 is an equivalent line diagram of a touch control signal driving line and a touch control signal sensing line in a second method for driving a display device according to an embodiment of the disclosure.

Referring to FIG. 9, an equivalent line diagram of a touch control signal driving line and a touch control signal sensing line (in the display device) is shown, in which m touch control signal driving lines (each of the touch control signal driving lines in this embodiment may be considered as a series structure formed by the touch control signal driving lines 101 and the gate line 104 as shown in FIG. 2) extend along a first axis direction and are arranged in parallel, where m is a positive integer. The m touch control signal driving lines include a touch control signal driving line T1 to a touch control signal driving line Tm, which are distributed sequentially. The touch control signal driving line T1, a touch control signal driving line T2, a touch control signal driving line T3, a touch control signal driving line Tm-2, a touch control signal driving line Tm-1 and the touch control signal driving line Tm are shown in FIG. 9. The gate line is the same line as the touch control signal driving line, that is, the touch control signal driving line T1 corresponds to a gate line G1, the touch control signal driving line T2 corresponds to a gate line G2, until the touch control signal driving line Tm corresponds to a gate line Gm.

The method for driving the display device according to the embodiment differs from the method according to the previous embodiment in that, three sequential touch control signal sensing lines are electrically connected together to form a touch control signal sensing line set. In this case, the display device has a touch control signal sensing line set RI1 to a touch control signal sensing line set RIn, where n is a positive integer. The touch-control signal sensing line set RI1, a touch-control signal sensing line set RI2 and the touch-control signal sensing line set RIn are shown specifically in FIG. 9.

Figure 10:
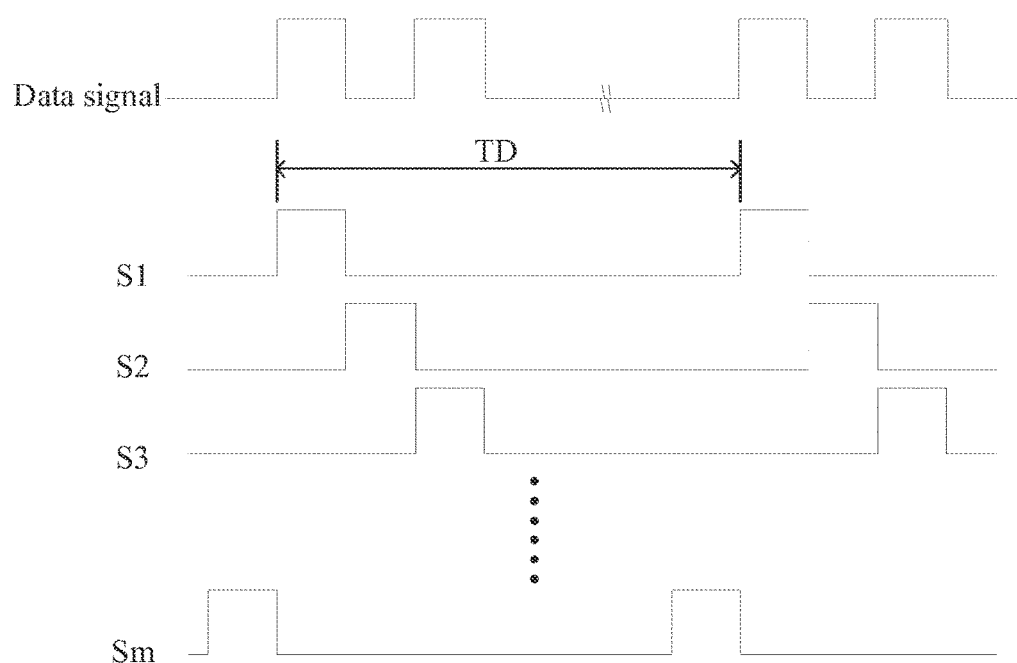
FIG. 10 is a timing diagram of signals in the second method for driving a display device according to an embodiment of the disclosure.

In conjunction with FIG. 9 and FIG. 10, FIG. 10 is a timing diagram of signals in the method for driving the display device according to the embodiment of FIG. 9.

The method for driving the display device according to the embodiment includes: transmitting synchronously data signals through the respective data lines from the beginning of a frame of picture to the end of the frame of picture; and then proceeding to the next frame of picture. The data signals are shown as a graph DATA in FIG. 10. When the data signals are transmitted through the data lines, the scanning signals are transmitted through the gate lines sequentially, to drive the pixels in the respective rows. Specifically, when the data signal is transmitted at a first time through the respective data lines, a scanning signal S1 is transmitted through the first gate line G1; when the data signal is transmitted at a second time through the respective data lines, a scanning signal S2 is transmitted thought the second gate line G2; when the data signal is transmitted at a third time through the respective data lines, a scanning signal S3 is transmitted through the third gate line G2; until a scanning signal Sm is transmitted thought the m-th (i.e., the last) gate line Gm when the data signal is transmitted at the last time through the respective data lines.

Moreover, the gate line is the same line as the touch control signal driving line, and therefore the scanning signal S1 is also used as a touch control driving signal for the first touch-control signal driving line T1. After the touch control driving signal is transmitted, all sets of the touch control signal sensing lines receive sequentially the coupling capacitances generated by the corresponding touch control driving signal, to detect the touch control operation. Similarly, the scanning signal S2 is also used as a touch control driving signal for the second touch control signal driving line T2, the scanning signal S3 is also used as a touch control driving signal for the third touch control signal driving line T3, and so on; until the scanning signal Sm is also used as a touch control driving signal for the m-th touch control signal driving line Tm.

Since three touch control signal sensing lines are used as one touch control signal sensing line set, a coupling capacitance generated by three touch control signal sensing lines is used as a touch control sensing signal, and thus the number of the touch control sensing signals, which is sensed each time, may be reduced. Therefore, the time for the touch control detection is shortened and the power consumption of the touch control detection is reduced. Moreover, in the case that three touch control signal sensing lines are electrically connected to form a touch control signal sensing line set, one touch control signal sensing line set only needs to be electrically connected to one lead and one pin. In this case, less leads and pins are required for the touch control signal sensing lines, the fabrication process is simplified and the wiring space is reduced.

It should be noted that two, four or five and more touch control signal sensing lines may be electrically connected to form one touch-control signal sensing line set, in other embodiments of the disclosure.

In the other embodiment of the disclosure, it is considered that the resolution of the touch control detection is not necessary to reach that of the display picture (that is, the resolution of the touch control detection may be lower than that of the display picture). Firstly multiple touch control signal driving lines may be used as one touch control signal driving line set, that is, one touch-control signal driving line set includes multiple touch control signal driving lines. The touch control signal sensing lines in one touch control signal driving line set are electrically connected together (that is, in a short-circuit connection together), to form a touch control signal sensing line set. In the touch control detection, the touch-control driving signals are sequentially transmitted through all of touch control signal driving lines in the touch control signal driving line set. Then, the respective touch control signal driving lines of touch-control signal driving line set receive the corresponding touch control sensing signals, and an average of the touch control sensing signals is calculated to determine a touch operation. With such method, not only the detection efficiency is improved, but also the detection accuracy is improved by using the average of the touch control sensing signals as the detection signal for determining the touch operation.

A method for fabricating an array substrate is provided according to another embodiment of the disclosure, in conjunction with FIG. 11 and FIG. 12A to FIG. 12C.

Figure 11:
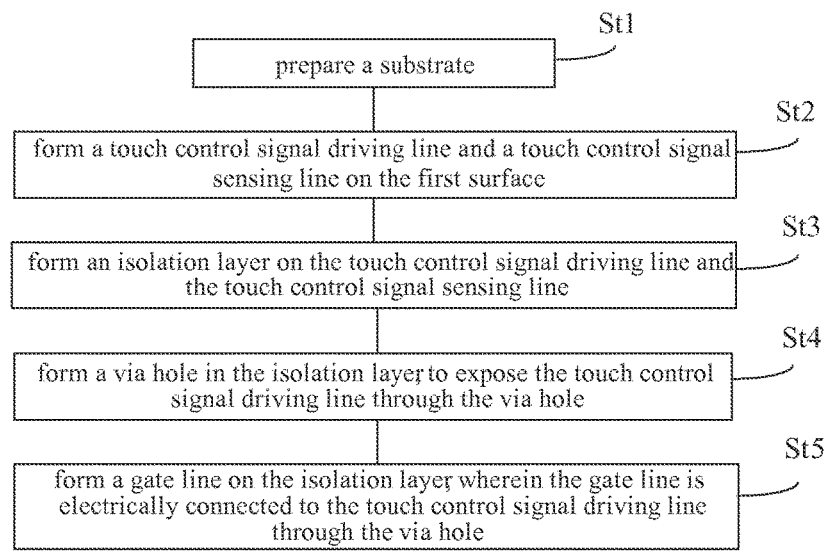
FIG. 11 is a flowchart of a method for fabricating an array substrate according to an embodiment of the disclosure.
Figure 12A:
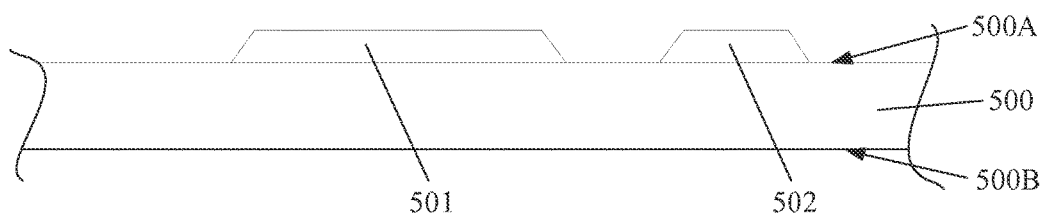
FIG. 12A to FIG. 12C are cross-sectional views of stages corresponding to respective steps in the flowchart shown in FIG. 11.

Referring to FIG. 11 and FIG. 12A, step St1 is performed, which includes: preparing a substrate 500.

In this embodiment, the substrate 500 has a first surface 500A and a second surface 500B. A material of the substrate 500 may be glass or plastic.

With reference to FIG. 11 and FIG. 12A, step St2 is performed, which includes: forming a touch control signal driving line 501 and a touch control signal sensing line 502 on the first surface 500A.

In this embodiment, a material of the touch control signal driving line 501 and the touch control signal sensing line 502 may be a transparent conductive metal oxide, such as indium tin oxide and zinc oxide.

Figure 12B:
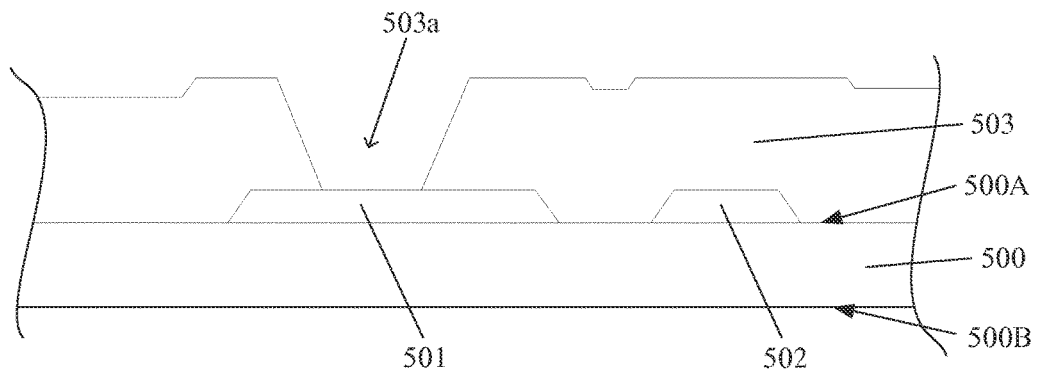

In conjunction with FIG. 11 and FIG. 12B, step St3 is performed, which includes: forming an isolation layer 503 on the touch control signal driving line 501 and the touch control signal sensing line 502, where the isolation layer 503 is insulative.

With reference to FIG. 11 and FIG. 12B, step St4 is performed, which includes: forming a via hole 503*a* in the isolation layer 503, to expose the touch control signal driving line 501 through the via hole 503*a*.

Figure 12C:
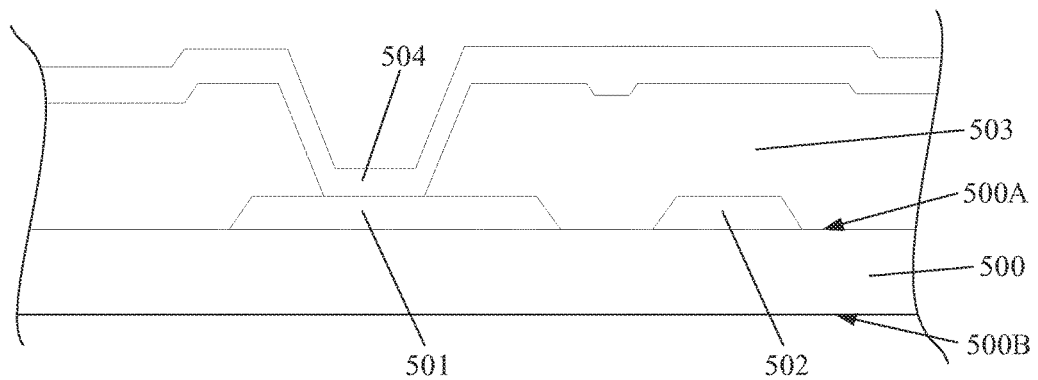

In conjunction with FIG. 11 and FIG. 12C, step St5 is performed, which includes: forming a gate line 504 on the isolation layer 503, where the gate line 504 is electrically connected to the touch control signal driving line 501 through the via hole 503a, as shown in FIG. 6.

In this embodiment, the touch control signal driving line 501 is electrically connected to the gate line 504, and thus the touch control signal driving line 501 is used as a scanning line.

The method for fabricating the array substrate according to the embodiment includes simple steps and can form the array substrate with both a display function and a touch control function. Moreover, the array substrate formed by means of the method can perform a normal display, while can achieve a touch control detection, thereby the display device with the array substrate is prevented from the undercharge of pixels.

A method for fabricating an array substrate is provided according to still another embodiment of the disclosure, in conjunction with FIG. 13A to FIG. 13F.

Figure 13A:
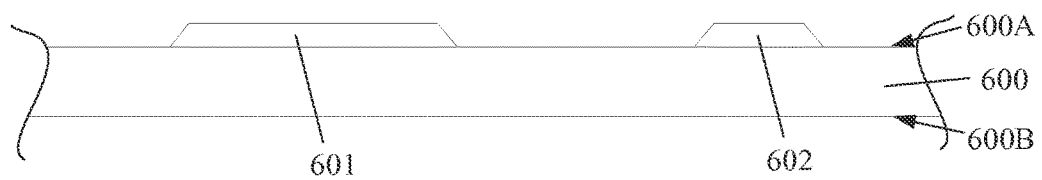
FIG. 13A to FIG. 13F are structural schematic diagrams of intermediate stages corresponding to respective steps in a method for fabricating an array substrate according to another embodiment of the disclosure.

Referring to FIG. 13A, a substrate 600 is prepared, where the substrate 600 has a first surface 600A and a second surface 600B.

In this embodiment, a material of the substrate 600 may be glass or plastic.

With reference to FIG. 13A, a touch control signal driving line 601 and a touch control signal sensing line 602 are formed on the first surface 600A.

In this embodiment, a material of the touch control signal driving line 601 and the touch control signal sensing line 602 may be a transparent conductive metal oxide such as indium tin oxide and zinc oxide. A metal material layer may be formed by means of a physical vapor deposition process, and then the metal material layer is etched to form the touch control signal driving line 601 and touch control signal sensing line 602. Since the touch control signal driving line 601 and the touch control signal sensing line 602 are formed by using the same material and process, the process and the step can be saved in the method for fabricating the array substrate according to the embodiment. However, in other embodiment of the disclosure, the touch control signal driving line 601 and the touch control signal sensing line 602 may respectively be fabricated by using different materials.

It should be noted that the touch control signal sensing line may be formed on the second surface 600B of the substrate 600, in another embodiment of the disclosure.

Figure 13B:
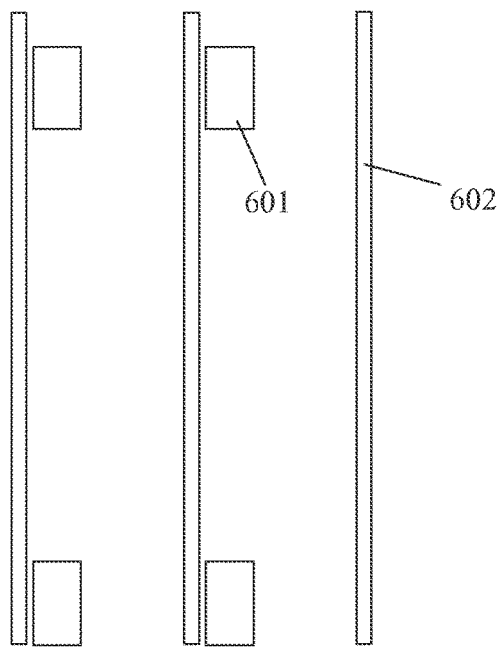

Turning now to FIG. 13B, which is a top view of the structure shown in FIG. 13A (the substrate 600 is omitted in FIG. 13B). Thus, the touch control signal sensing line 602 extends along a first direction in the shown plane, and the top-view structure of the touch control signal driving line 601 is of a rectangular shape. Although the touch control signal driving lines 601 are distributed in blocks in the plane shown in FIG. 13B; and subsequently, the touch-control signal driving lines 601 forms a linear structure extended along a second direction (referring to the series structure described in the above embodiments), by the gate line (referring to FIG. 13F).

Figure 13C:
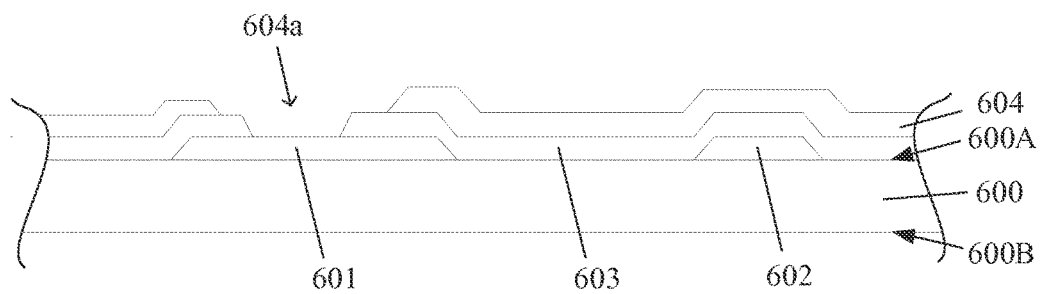
Figure 13D:
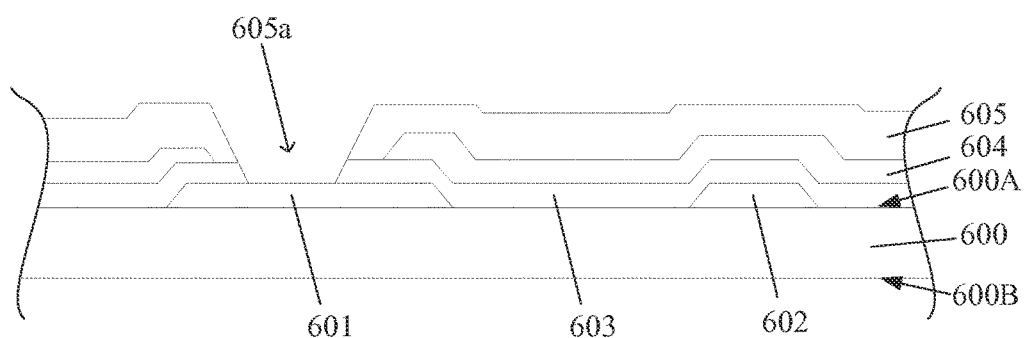

In the subsequent FIG. 13C and FIG. 13D, an isolation layer is formed on the touch control signal driving line 601 and the touch control signal sensing line 602 in this embodiment. The isolation layer includes a first insulation layer 603, a shielding layer 604 and a second insulation layer 605. The shielding layer 604 is electrically conductive and functions as an electrostatic shielding. Although the shielding layer 604 is electrically conductive, the shielding layer 604 is disposed between the first insulation layer 603 and the second insulation layer 605 in the isolation layer, and thus the isolation layer as a whole still has an electrically isolating function.

Referring to FIG. 13C, the first insulation layer 603 is formed on the touch control signal driving line 601 and the touch control signal sensing line 602.

In this embodiment, a material of the first insulation layer 603 may be silicon oxide or silicon nitride.

As seen in FIG. 13C, the shielding layer 604 is formed on the first insulation layer 603.

In this embodiment, a material of the shielding layer 604 may be a transparent conductive metal oxide such as indium tin oxide. The shielding layer 604 is located above the touch control signal driving line 601 and the touch control signal sensing line 602. Therefore, the shielding layer may prevents the electrical signals of other conductive layers from interfering the touch control signal driving line 601 and the touch control signal sensing line 602, and thus a signal to noise ratio of the touch control detection is improved.

It should be noted that the shielding layer 604 located above the first region (referring to the first region 300a in FIG. 5) may be removed in the other embodiment of the disclosure. The first region is located between the touch control signal driving line 601 and the touch control signal sensing line 602. The portion of the shielding layer 604 is removed, so as to prevent lots of electric field lines generated between the touch control signal driving line 601 and the touch control signal sensing line 602 from passing through the part of the shielding layer 604. Therefore, it is ensured that more electric field lines pass through the second surface 600B of the substrate 600, and the electric field lines passing through the second surface 600B of the substrate 600 may be applied to the touch control detection. Therefore, the sensitivity of the touch control detection is improved.

Still referring to FIG. 13C, a first via hole 604a is formed in the first isolation layer 603 and the shielding layer 604, to expose at least a portion of the touch control signal driving line 601.

Referring to FIG. 13D, the second insulation layer 605 is formed on the first insulation layer 603 and the shielding layer 604, in which the second insulation layer 605 covers a side wall and a bottom of the first via hole 604a shown in FIG. 13D. Then, at least a portion of the second insulation layer 605 formed at the bottom of the first via hole 604a is removed to form a second via hole 605a, to expose at least a portion of the touch-control signal driving line 601.

In this embodiment, the second insulation layer 605 is a color filter layer. The color filter layer may have a variety of structures which are well known to those skilled in the art and will be omitted herein. Since the second insulation layer 605 is the color filter layer, a color filter substrate is not required for a display device with this array substrate, and thus the process for separately fabricating the color filter substrate may be omitted in a process of fabricating the display device.

Figure 13E:
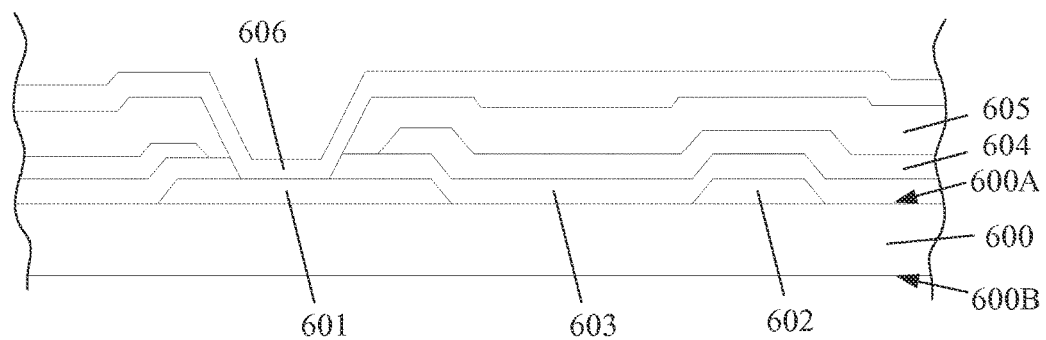

Referring to FIG. 13E, a gate line 606 is formed on the second insulation layer 605, and the gate line 606 is electrically connected to the touch control signal driving line 601 through the second via hole 605a.

Figure 13F:
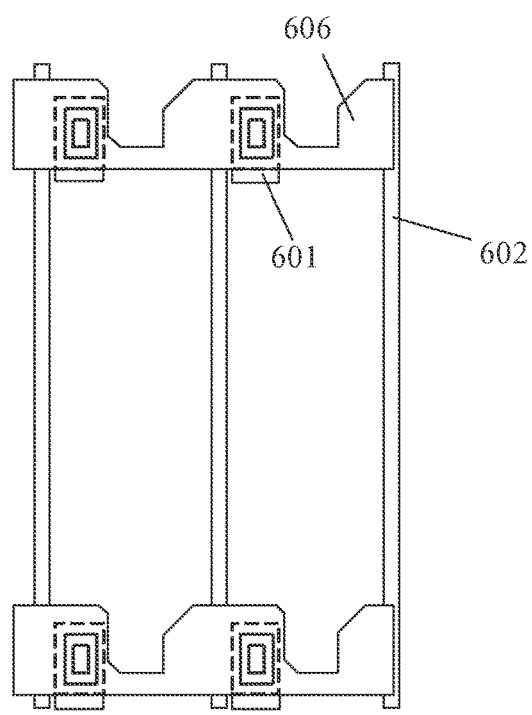

Turning now to FIG. 13F, which is a top view of the structure shown in FIG. 13E (the substrate 600 is omitted in FIG. 13F). Since the gate line 606 is electrically connected to the touch control signal driving line 601 through the second via hole 605a (the locations of the first via hole 604a and the second via hole 605a are represented by two dashed boxes respectively, not noted in FIG. 13F), the touch control signal driving lines 601 distributed in the plane is connected in serial by the gate line 606 (the port of the touch control signal driving lines 601 covered by the gate line 606 is represented by a dashed line in FIG. 13F) to form a linear structure extended along the second direction (referring to the series structure described in the above embodiments).

Although not shown in this drawing, in this embodiment, a pixel electrode and a common electrode may be formed on the touch control signal driving line 601, and an electric field can be formed between the pixel electrode and the common electrode. As mentioned previously, in this embodiment, the top-view structure of the touch control signal driving line 601 is of a rectangular shape, and one pixel electrode and one common electrode are formed above one rectangular structure.

It should be noted that the area of the top-view structure of the touch control signal driving line may be increased in other embodiment of the disclosure, which contributes to a larger coupling capacitance capacity generated between the touch control signal driving line and the touch control signal sensing line. Therefore, the sensitivity of the touch control detection is improved. With the increase of the area of the top-view structure, more than two pixel electrodes may be formed above one touch control signal driving line, and more than two common electrodes may be formed above one touch control signal driving line.

It should be noted that, it may be not necessary to form a common electrode on the array substrate, and the common electrode is formed on another substrate facing to the array substrate, in other embodiments of the disclosure.

Although not shown in this drawing, a black matrix may be formed on the color filter layer (namely the second insulation layer 605) in this embodiment. The black matrix may be located directly on the color filter layer, or other structures may be disposed between the black matrix and the color filter layer. In the case that the black matrix is formed above the touch control signal sensing line 602, the touch control signal sensing line 602 may be fabricated by aluminum, copper, or an alloy thereof.

Although not shown in this drawing, the structures such as a thin film transistor, a data line, a planarizing layer and an orientation layer may be formed in this embodiment. The gate of the thin film transistor is electrically connected to the gate line 606, the source of the thin film transistor is electrically connected to the data line, and the drain of the thin film transistor is electrically connected to the pixel electrode.

The method for fabricating the array substrate according to the embodiment is simple, and the fabricated array substrate can perform both a display scan and a touch control detection. It is more important that the array substrate with the shielding layer 604 is formed according to the embodiment. Due to the shielding layer 604, the touch control signal driving line 601 and the touch control signal sensing line 602 may be shielded from the interference of conductive structures above the shielding layer 604. Therefore, the display device with the array substrate can have a touch control function with a high signal to noise ratio.

Preferred embodiments of the present invention are described above, which should not be interpreted as limiting the present invention. Various alternations and modifications can be made to the above-described embodiments by any one of those skilled in the art without deviation from the spirit and scope of the present invention. Therefore, the scope of protection of the present invention is defined by the appended claims.

What is claimed is:

1. An array substrate, comprising:
a substrate having a first surface and an opposing second surface;
a touch control signal driving line and a touch control signal sensing line disposed on the first surface, wherein the touch-control signal driving line is insulated from the touch control signal sensing line and intersects with the touch control signal sensing line;
an isolation layer disposed on the first surface and covering the touch control signal driving line;
a via hole formed in the isolation layer;
a gate line disposed on the isolation layer, above and overlapping with the touch control signal driving line and the touch control signal sensing line along a direction from the opposing second surface to the first surface, the gate line being electrically connected to the touch control signal driving line through the via hole; and
a pixel electrode disposed above and overlapping with the touch control signal driving line, the touch control signal sensing line, the isolation layer and the gate line along the direction from the opposing second surface to the first surface, wherein:
the isolation layer comprises a shielding layer disposed above the touch control signal driving line and insulated from the touch control signal driving line, a first insulation layer disposed between the shielding layer and the touch control signal driving line and isolates the touch control signal driving line and the touch control signal sensing line, and a second insulation layer formed between the shielding layer and the gate line, and
the second insulation layer is a color filter layer disposed between the gate line and the touch control signal driving line.

2. The array substrate according to claim 1, wherein the touch control signal sensing line is formed in a same layer with the touch control signal driving line.

3. The array substrate according to claim 2, wherein a first region is provided between the touch control signal driving line and the touch control signal sensing line, and a portion of the shielding layer located exactly above the first region is hollowed.

4. The array substrate according to claim 1, further comprising another touch control signal sensing line formed on the opposing second surface.

5. The array substrate according to claim 1, further comprising a data line, the pixel electrode and a thin film transistor formed on the first surface, wherein the gate line is electrically connected to a gate of the thin film transistor, the data line is electrically connected to a source of the thin film transistor, and the pixel electrode is electrically connected to a drain of the thin film transistor.

6. The array substrate according to claim 1, wherein the gate line is electrically connected to the touch control signal driving line through the via hole to transmit a touch control driving signal and a scanning signal simultaneously.

7. The array substrate according to claim 1, wherein the shielding layer is isolated from the gate line by the second insulation layer.

8. The array substrate according to claim 1, wherein the shielding layer is enclosed and sandwiched between the first insulation layer and the second insulation layer.

9. A display device comprising an array substrate and an opposing rear substrate, wherein the array substrate comprises:

a substrate having a first surface and an opposing second surface;

a touch control signal driving line and a touch control signal sensing line disposed on the first surface, wherein the touch-control signal driving line is insulated from the touch control signal sensing line and intersects with the touch control signal sensing line;

an isolation layer disposed on the first surface and covering the touch control signal driving line;

a via hole formed in the isolation layer;

a gate line disposed on the isolation layer, above and overlapping with the touch control signal driving line and the touch control signal sensing line along a direction from the opposing second surface to the first surface, the gate line being electrically connected to the touch control signal driving line through the via hole;

a common electrode disposed above and overlapping with the touch control signal driving line and the gate line along the direction from the opposing second surface to the first surface; and a pixel electrode disposed above and overlapping with the touch control signal driving line, the touch control signal sensing line, the isolation layer and the gate line along the direction from the opposing second surface to the first surface, wherein:

the isolation layer comprises a shielding layer disposed above the touch control signal driving line and insulated from the touch control signal driving line, a first insulation layer disposed between the shielding layer and the touch control signal driving line and isolates the touch control signal driving line and the touch control signal sensing line, and a second insulation layer formed between the shielding layer and the gate line, the second insulation layer is a color filter layer disposed between the gate line and the touch control signal driving line, and a backlight is disposed on one side of the opposing rear substrate away from the array substrate.

10. The display device according to claim 9, wherein the touch control signal sensing line is formed in a same layer with the touch control signal driving line.

11. The display device according to claim 10, wherein a first region is provided between the touch control signal driving line and the touch control signal sensing line, and a portion of the shielding layer located exactly above the first region is hollowed.

12. The display device according to claim 9, wherein the array substrate further comprises a data line, the pixel electrode and a thin film transistor formed on the first surface, wherein the gate line is electrically connected to a gate of the thin film transistor, the data line is electrically connected to a source of the thin film transistor, and the pixel electrode is electrically connected to a drain of the thin film transistor.

13. The display device according to claim 9, wherein the shielding layer is isolated from the gate line by the second insulation layer.

14. The display device according to claim 9, wherein the shielding layer is enclosed and sandwiched between the first insulation layer and the second insulation layer.

* * * * *